United States Patent [19]

Nakamoto et al.

[11] Patent Number: 5,077,242

[45] Date of Patent: Dec. 31, 1991

[54] FIBER-REINFORCED CERAMIC GREEN BODY AND METHOD OF PRODUCING SAME

[75] Inventors: Takashi Nakamoto, Kamifukuoka; Yasunobu Kawakami, Tsurugashima; Masahiro Ohta, Kawagoe; Yuki Kono, Tokyo, all of Japan

[73] Assignee: Honda Giken Kogyo Kabushiki Kaisha, Tokyo, Japan

[21] Appl. No.: 643,110

[22] Filed: Jan. 22, 1991

Related U.S. Application Data

[63] Continuation of Ser. No. 317,500, Mar. 1, 1989, abandoned.

[30] Foreign Application Priority Data

Mar. 2, 1988 [JP] Japan .................. 63-49169

[51] Int. Cl.$^5$ .................. C04B 35/58; C04B 35/76
[52] U.S. Cl. .................. 501/95; 501/97; 501/98; 501/127; 501/152
[58] Field of Search .................. 501/95, 97, 127, 98, 501/152

[56] References Cited

U.S. PATENT DOCUMENTS

| | | | |
|---|---|---|---|
| 3,736,160 | 5/1973 | Hamling | 501/103 |
| 4,341,965 | 7/1982 | Okuo et al. | 501/95 |
| 4,696,710 | 9/1987 | Minjolle et al. | 264/63 |
| 4,789,277 | 12/1988 | Rhodes et al. | 501/95 |

FOREIGN PATENT DOCUMENTS

| | | |
|---|---|---|
| 0128409 | 12/1984 | European Pat. Off. . |
| 0184837 | 6/1986 | European Pat. Off. . |
| 2648459 | 4/1977 | Fed. Rep. of Germany ........ 501/95 |
| 52-047803 | 4/1977 | Japan .................. 501/95 |
| 56-092180 | 7/1981 | Japan .................. 501/95 |
| 58-091061 | 5/1983 | Japan .................. 501/95 |
| 59-137366 | 8/1984 | Japan .................. 501/95 |
| 60-231467 | 11/1985 | Japan .................. 501/95 |
| 61-091063 | 5/1986 | Japan .................. 501/95 |
| 86/05480 | 9/1986 | PCT Int'l Appl. . |
| 86/05774 | 10/1986 | PCT Int'l Appl. . |

*Primary Examiner*—William R. Dixon, Jr.
*Assistant Examiner*—Anthony J. Green
*Attorney, Agent, or Firm*—Armstrong, Nikaido, Marmelstein, Kubovcik & Murray

[57] ABSTRACT

A fiber-reinforced ceramic green body containing fine ceramic fibers uniformly dispersed in a ceramic matrix. The green body is composed of 50 weight % or more of a ceramic main component such as $Si_3N_4$ and 50 weight % or less of at least one ceramic additive such as $Al_2O_3$ and $Y_2O_3$, at least part of one or both of said ceramic main component and said ceramic additive being in the form of fine fibers. This green body is produced by a slip casting method.

9 Claims, 1 Drawing Sheet

FIBER-REINFORCED CERAMIC GREEN BODY AND METHOD OF PRODUCING SAME

This application is a continuation of application Ser. No. 317,500 field Mar. 1, 1989, abandon.

BACKGROUND OF THE INVENTION

The present invention relates to a ceramic green body with improved mechanical strength and a method of producing it, and more particularly to a ceramic green body reinforced by fibrous ceramic additives and a method of producing it.

Ceramic sintered bodies are generally produced by first forming green bodies of certain shapes from ceramic powder and then sintering them. Since ceramics are not easy to work once sintered, they should be formed into desired shapes before sintering. Known as methods of producing such ceramic green bodies are a die pressing method, an injection molding method, a slip casting method in which ceramic slips are cast into gypsum molds, a cold isostatic pressing method by rubber presses, etc. In order to produce green bodies with extremely small thickness or complicated shapes, the slip casting method, the injection molding method, a molding method by a doctor blade, etc. are preferable.

In particular, the slip casting method is preferable because it can produce green bodies of thin and complicated shapes with extreme easiness. It may be conducted by dispersing ceramic starting material powder in water and casting the resulting slip into a gypsum mold, thereby causing the gypsum mold to absorb and remove water to provide a green body. Particularly when silicon nitride ceramic green bodies are produced, silicon nitride powder is mixed with sintering aides such as $Y_2O_3$, etc. and other additive powder, and then the above slip casting method is conducted.

However, when a ceramic green body is produced by such a slip casting method, the force bonding ceramic powder particles is not necessarily large even though a binder, etc. is added to the ceramic slip, and so the resulting green body is likely to be cracked or broken because of poor mechanical strength. Further, because of dewatering and drying in the gypsum mold, the ceramic green body is shrinked, thus susceptible to cracking. Thus, it has been difficult to produce thin green bodies or those having complicated shapes without danger of breakage or cracking.

Incidentally, composite ceramics containing ceramic whiskers such as SiC whiskers are known. The ceramic whiskers serve as reinforcing fillers in the sintered ceramics. However, in the green bodies, the ceramic whiskers do not show sufficient reinforcing effects. Particularly when the slip casting method is employed, the deformation, cracking and even breakage of the green bodies are not effectively prevented by the addition of ceramic whiskers.

On the other hand, the addition of fibrous zirconia in the form of tow, yarn, woven fabrics, felts, roving, knits, braids, paper and the like to cement composites is known (U.S. Pat. No. 3,736,160). However, in the cement composites, fibrous zirconia is not uniformly dispersed in a matrix, and rather it is impregnated with ceramic compounds. Therefore, it is difficult to produce green bodies of extremely thin or complicated shapes with fibrous zirconia in the form of tow, yarn, etc. impregnated with ceramic compounds.

OBJECT AND SUMMARY OF THE INVENTION

Accordingly, an object of the present invention is to overcome the above problems of such conventional techniques, thereby providing a ceramic green body with sufficient mechanical strength and cracking resistance.

More particularly, the object of the present invention is to provide a fiber-reinforced ceramic green body suffering from no cracking or breakage.

Another object of the present invention is to provide a method of producing such a fiber-reinforced ceramic green body with high precision and high yield.

As a result of intense research in view of the above objects, the inventors of the present invention have found that the addition of fine ceramic fibers to a ceramic matrix serves to provide the resulting ceramic green body with sufficient mechanical strength and cracking resistance. The present invention is based upon this finding.

Thus, the fiber-reinforced ceramic green body of the present invention contains fine ceramic fibers uniformly dispersed in the ceramic matrix.

Further, the method producing a fiber-reinforced ceramic green body according to the present invention comprises the steps of preparing a slip containing uniformly dispersed fine ceramic fibers: casting the slip into a mold of a desired shape to produce a green body: and then dewatering and drying it.

DETAILED DESCRIPTION OF THE INVENTION

Figure 1:
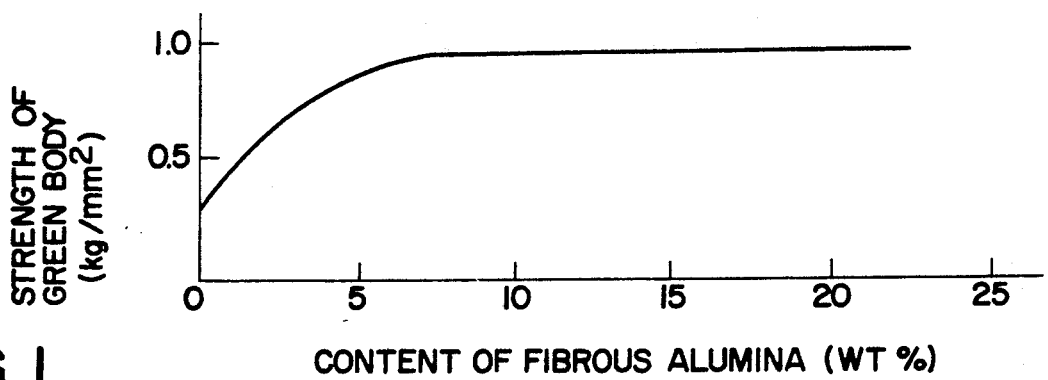
FIG. 1 is a graph showing the relation between the amount of fibrous alumina and mechanical strength of the silicon nitride ceramic green body.

The present invention is applicable to any types of ceramic green bodies, and fine ceramic fibers in the ceramic green bodies may be their main components or their additive components such as sintering aids, etc. Further, at least part of the total ceramic components need only be fibrous, and the percentage of fibrous ceramic components can be determined properly from the viewpoint of dispersability and moldability.

The present invention will be described in detail with respect to a silicon nitride ceramic green body.

Silicon nitride powder may be of $\alpha$-type or $\beta$-type crystal structure, and it may be produced by any methods, such as a method of nitriding Si, a method of reducing silica and nitriding it, a heat decomposition method of silicon diimide, a vapor phase reaction method of $SiH_4 + NH_3 + N_2$, etc. The silicon nitride powder preferably has an average particle size of 3–0.01 $\mu$m, and more preferably 1.5–0.1 $\mu$m.

The ceramic additives include alumina, yttria, magnesia, calcia, aluminum nitride, etc. The ceramic additives may include those serving as sintering aids.

At least part of the silicon nitride and/or ceramic additives should be fibrous. Which ceramic components are made fibrous can be determined depending upon the composition and sintering conditions of the ceramic green body. For instance, in the case of $Si_3N_4+Y_2O_3+Al_2O_3$, $Al_2O_3$ is desirably fibrous. In this case, $Y_2O_3$ may also be fibrous totally or partially.

The ceramic fibers have an average diameter of 10 μm or less, particularly 5–0.5 μm, and a fiber length is 10–500 μm, particularly 100–300 μm. When the average diameter and the fiber length are too large, the dispersability of the ceramic fibers is reduced, making more likely the defects of the sintered products, and also reducing their sintering densities. On the other hand, when the average diameter and the fiber length are too small, sufficient reinforcing effects cannot be obtained by the addition of the fine ceramic fibers.

In the silicon nitride ceramic green body of the present invention, silicon nitride powder is 50 weight % or more, and the ceramic additives are 50 weight % or less. Further, at least part of the ceramic additives is fibrous. Specifically, 0.1 weight % or more, based on the resulting green body, of the ceramic additives should be fine ceramic fibers. When the percentage of the fine ceramic fibers is lower than 0.1 weight %, sufficient reinforcing effects cannot be obtained, making more likely the breakage and cracking in the resulting ceramic green bodies.

Particularly when the silicon nitride ceramic green body consists essentially of $Si_3N_4$, $Y_2O_3$ and $Al_2O_3$, it is preferred that $Si_3N_4$ powder is 50 weight % or more, and $Al_2O_3+Y_2O_3$ is 0.1-50 weight % or less, $Al_2O_3$ being 0.1-30 weight % in the form of fine fibers, and $Y_2O_3$ being 0.1-50 weight % in the form of powder. However, even when $Y_2O_3$ is fibrous partially or totally, the object of the present invention can be achieved. Incidentally, in this case, the $Si_3N_4$ powder desirably has an average particle size of 0.01-3 μm.

The ceramic green body of the present invention may further contain, in addition to the above components, organic binders such as wax, resins, etc. and organic or metallic fibers, etc.

Next, the method of producing the ceramic green body according to the present invention will be explained below.

First, ceramic powder and fibrous ceramic are uniformly dispersed in a dispersing medium such as water or an organic solvent to produce a slip. In this case, all of the ceramic starting materials may be added simultaneously, or well-dispersable $Si_3N_4$ powder and $Y_2O_3$ powder are added first and then fine $Al_2O_3$ fibers are added to achieve its good dispersion.

When water is used as a dispersing medium, it is preferably an ammonia aqueous solution. Since $NH_4OH$ serves to provide good dispersability, a ceramic slurry of a high concentration and a low viscosity can be prepared. After drying, a high-density green body can be obtained. In addition, the sintered product does not contain impurities such as carbon, sodium, potassium, etc. Thus, the high-purity sintered product can be obtained. Further, since the oxidation of silicon nitride can be prevented, the sintered product can have excellent high-temperature strength. Incidentally, if silicon nitride is oxidized, vitreous silica is formed, reducing the high-temperature strength of the resulting sintered product. In the case of using a polar organic solvent such as formamide as a dispersing medium, too, the oxidation of silicon nitride is prevented so that the high-temperature strength of the sintered product can be obtained.

In addition to the above components, binders, etc. may be added properly.

In the present invention, the concentration of the slip is not particularly restricted, but it is preferably 40–60 volume % from the viewpoint of moldability.

In the present invention, the formation of the green body may be conducted by injection molding, slip casting, casting with a doctor blade, etc., but when the slip casting method is employed, particularly good results are obtained.

In the case of the slip casting method, the slip is cast into the mold made of a water-absorbing, water-permeable material. Since the dispersing medium is removed from the slip through the mold, the slip is dewatered. After that, it is removed from the mold and fully dried. In the dewatering and drying step, the green body is susceptible to breakage and cracking. However, since the ceramic green body of the present invention is fully reinforced by uniformly dispersed fine ceramic fibers, its breakage and cracking can be sufficiently prevented.

The silicon nitride ceramic green body is finally sintered. In the sintering step, the fine ceramic fibers in the green body are melted and lose their fibrous shape, thereby occupying grain boundaries between the $Si_3N_4$ grains. Thus, the sintered product can have as good mechanical strength and heat resistance as those of ceramic sintered bodies produced without using ceramic fibers.

Besides the silicon nitride ceramics, the present invention is applicable to aluminum titanate containing fine alumina fibers. In this case, the size and amount of fine alumina fibers are the same as those described above.

According to the present invention, since the green body, which would be easily broken and cracked if made only of ceramic powder, is reinforced by fine ceramic fibers, the ceramic green body has extremely improved mechanical strength, elongation, resistance to strain, etc. In addition, the shrinkage of the ceramic green body at the time of drying can be minimized. As a result, the breakage and cracking of the green body are drastically reduced. This seems to be due to the fact that fine ceramic fibers uniformly dispersed in the ceramic powder matrix are properly intertwined with each other, so that mechanical strength such as tensile strength, fracture strength, etc. of the green body is improved, and also the elongation [deflection] at fracture is also increased.

In addition, the fine ceramic fibers lose their fibrous shape by sintering, they do not affect the strength of the resulting sintered body.

The present invention will be further explained by the following Examples.

EXAMPLE 1

3 weight % of yttria powder (average particle size: 1.0 μm) was added to 92 weight % of silicon nitride powder (average particle size: 0.3 μm), and uniformly mixed in water by ball-milling. Next, 5 weight % of alumina fibers (average diameter: 3 μm, average fiber length: 100 μm) were added and mixed with the above mixture for 1 hour to produce a slip. The slip was then cast into a gypsum mold to produce a pillar-shaped green body by a slip casting method. After being removed from the gypsum mold, it was dried by elevating its temperature from room temperature to 180° C. and keeping it at that temperature for 1 hour.

The resulting green body was measured with respect to bending strength, deflection up to fracture and shrinkage by drying. The results are as follows:

| | |
|---|---|
| Bending strength | 0.7 kg/mm² |
| Deflection up to fracture* | 0.07 mm |
| Shrinkage | 0.4% |

Note*:
Deflection up to fracture was measured on a test piece of 10 mm × 10 mm × 50 mm by a 3-point bending method (span length: 33.6 mm).

This green body was not broken or cracked in handling, and after drying its shrinkage was small.

Next, this green body was sintered in a nitrogen gas atmosphere at 1850° C. for 10 hours. The resulting silicon nitride sintered body had a density of 94% or more, and it had good shape precision.

EXAMPLE 2

Figure 2:
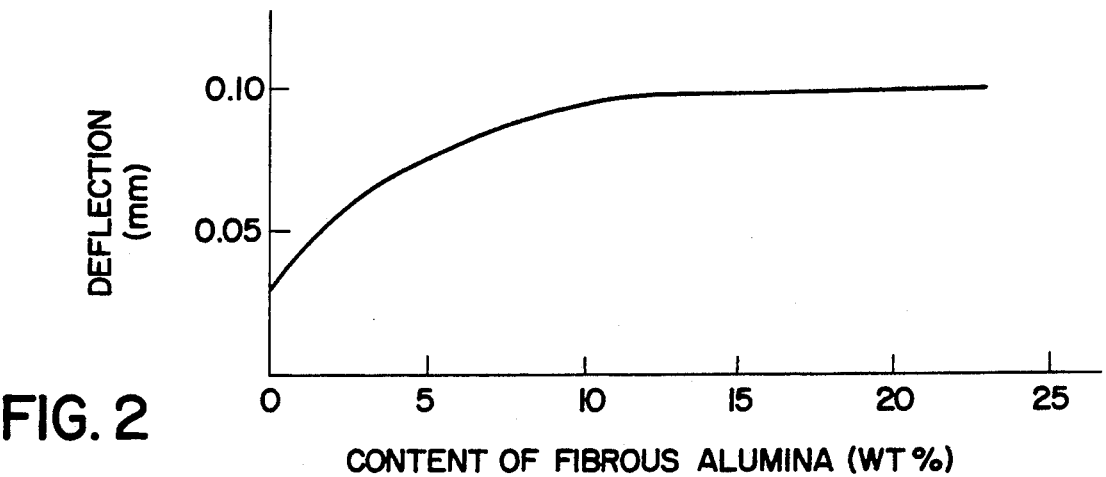
FIG. 2 is a graph showing the relation between the amount of fibrous alumina and deflection of the silicon nitride ceramic green body.

Green bodies were produced under the same conditions as in Example 1 except for changing the amount of alumina fibers from 0 weight % to 30 weight %. The resulting green bodies were measured with respect to bending strength and deflection. The results are shown in FIGS. 1 and 2.

From the above results, it has been found that to achieve good bending strength and deflectability, the amount of alumina fibers is preferably 0.1 weight % or more.

EXAMPLE 3

Figure 3:
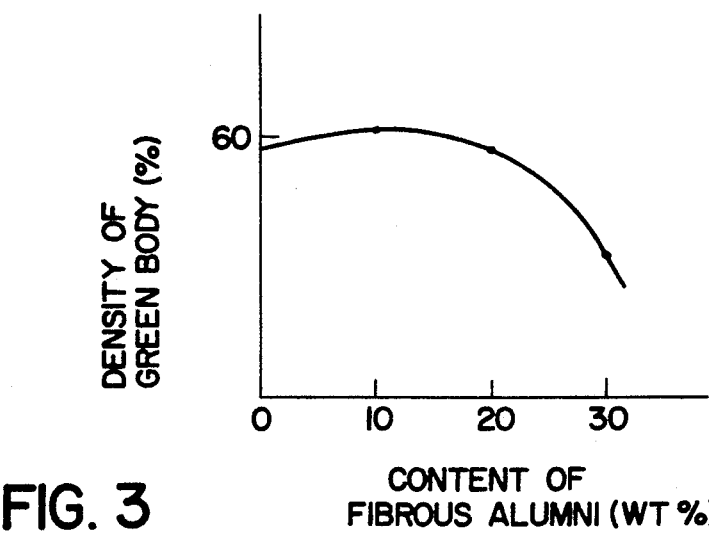
FIG. 3 is a graph showing the relation between the amount of fibrous alumina and density of silicon nitride ceramic green body.

Green bodies were produced under the same conditions as in Example 1 except for changing the amount of alumina fibers. Incidentally, when the alumina fibers were less than 5 weight %, the alumina powder (average particle size: 0.4 μm) was added to keep the total amount of alumina fibers and alumina powder at 5 weight %. The resulting green bodies were measured to determine the relation between the amount of alumina fibers and the density of the green body. The results are shown in FIG. 3.

COMPARATIVE EXAMPLE 1

Green bodies were produced in the same manner as in Example 1 except for using 5 weight % of alumina powder having an average particle size of 0.4 μm instead of alumina fibers.

The resulting green bodies were measured with respect to bending strength, deflection up to fracture and shrinkage by drying. The results are as follows:

| | |
|---|---|
| Bending strength | 0.3 kg/mm2 |
| Deflection up to fracture | 0.02 mm |
| Shrinkage | 0.7% |

The green bodies were easily broken in handling, and their shrinkage by drying was large, thus causing cracking. Accordingly, the yield of the green bodies was extremely low.

As described above in detail, since the ceramic green body of the present invention contains fine ceramic fibers uniformly dispersed in a ceramic powder matrix, it not only shows high mechanical strength and large elongation, deflection up to fracture, but also small shrinkage. Accordingly, even when the ceramic green body of the present invention is extremely thin or has a complicated shape, it is less likely to be broken or cracked.

Further, according to the method of the present invention, since the ceramic green body is produced by using a slip containing a ceramic powder and fine ceramic fibers, the green body does not suffer from cracking by dewatering and drying, and it is less likely to be broken.

In addition, since the fine ceramic fibers in the green body are melted by sintering, they are diffused in the grain boundaries between ceramic crystal grains. Therefore, the sintered bodies obtained from the ceramic green bodies of the present invention show good mechanical strength and heat resistance. Particularly when the ceramic green bodies are made of silicon nitride, they are highly suitable for producing automobile parts such as rotor blades of turbochargers, etc.

What is claimed is:

1. A fiber-reinforced ceramic green body obtained by a process comprising the steps of:
    (1) preparing a slip by dispersing ceramic starting materials in a liquid dispersing medium, said ceramic starting materials consisting essentially of:
        (a) at least 50% by weight of $Si_3N_4$ powder, and
        (b) at most 50% by weight of ceramic additives consisting essentially of alumina and yttria, wherein at least 0.1% by weight, based on the ceramic starting materials, of said ceramic additives is in the form of fine fibers which are dispersed uniformly in the slip, said fine fibers having an average diameter of 3-5 μm and a fiber length of 100-300 μm; and
    (2) slip casting the obtained slip.

2. A fiber-reinforced ceramic green body according to claim 1, wherein said fine fibers are alumina fibers.

3. A fiber-reinforced ceramic green body according to claim 2, wherein the amount of said fine fibers of alumina is 0.1-30% by weight based on the ceramic starting materials.

4. A fiber-reinforced ceramic green body according to claim 1, wherein the amount of said $Si_3N_4$ powder is at least 50% by weight, and the combined amount of alumina and yttria is 0.1-50% by weight, and the yttria being in the form of powder.

5. A fiber-reinforced ceramic green body according to claim 4, wherein said $Si_3N_4$ powder has an average particle size of 0.01-3 μm.

6. A method of producing a fiber-reinforced ceramic green body comprising the steps of:
    (1) preparing a slip by dispersing ceramic starting materials in a liquid dispersing medium, said ceramic starting materials consisting essentially of:
        (a) at least 50% by weight of $Si_3N_4$ powder, and
        (b) at most 50% by weight of ceramic additives consisting essentially of alumina and yttria, wherein at least 0.1% by weight, based on the ceramic starting materials, of said ceramic additives is in the form of fine fibers which are dispersed uniformly in the slip, said fine fibers having an average diameter of 3-5 μm and a fiber length of 100-300 μm; and
    (2) slip casting the obtained slip.

7. A method according to claim 6, wherein said slip is cast into a gypsum mold.

8. A method according to claim 6, wherein the amount of said $Si_34$ powder is at least 50% by weight, and the combined amount of alumina and yttria is 0.1-50% by weight, the alumina being 0.1-30% by weight in the form of fine fibers, and the yttria being in the form of powder.

9. A method according to claim 8, wherein said $Si_3N_4$ powder has an average particle size of 0.01-3 μm.

* * * * *